US008118663B2

(12) United States Patent
Cole

(10) Patent No.: US 8,118,663 B2

(45) Date of Patent: Feb. 21, 2012

(54) METHOD AND SYSTEM FOR CHANGING THE APPEARANCE OF GAMING MACHINES AS PART OF OPTIMIZING THE NUMBER OF GAMING MACHINES PRESENTING PARTICULAR GAMES

(75) Inventor: Joseph W. Cole, Gallatin, TN (US)

(73) Assignee: Cole Kepro International, LLC, North Las Vegas, NV (US)

( * ) Notice: Subject to any disclaimer, the term of this patent is extended or adjusted under 35 U.S.C. 154(b) by 102 days.

(21) Appl. No.: 12/657,827

(22) Filed: Jan. 27, 2010

(65) Prior Publication Data

US 2010/0137060 A1 Jun. 3, 2010

Related U.S. Application Data

(63) Continuation-in-part of application No. 11/805,318, filed on May 22, 2007, now Pat. No. 7,862,436, which is a continuation-in-part of application No. 11/205,839, filed on Aug. 17, 2005, now abandoned.

(60) Provisional application No. 60/615,774, filed on Oct. 4, 2004.

(51) Int. Cl.
*G06F 17/00* (2006.01)

(52) U.S. Cl. ........................................................ 463/20

(58) Field of Classification Search .............. 463/16–25, 463/29, 40–42

See application file for complete search history.

(56) References Cited

U.S. PATENT DOCUMENTS

| | | | | |
|---|---|---|---|---|
| 4,440,457 | A | 4/1984 | Fogelman et al. | |
| 4,844,567 | A | 7/1989 | Chalabian | |
| 5,813,914 | A | 9/1998 | McKay et al. | |
| 6,068,101 | A | 5/2000 | Dickenson et al. | |
| 6,319,125 | B1 * | 11/2001 | Acres | 463/25 |
| 6,578,847 | B1 | 6/2003 | Hedrick et al. | |
| 6,702,409 | B2 | 3/2004 | Hedrick et al. | |
| 6,997,810 | B2 | 2/2006 | Cole | |
| 7,803,053 | B2 * | 9/2010 | Atkinson | 463/42 |
| 7,833,102 | B2 * | 11/2010 | Beadell et al. | 463/46 |
| 7,966,485 | B2 * | 6/2011 | Chen et al. | 713/2 |
| 2004/0229698 | A1 | 11/2004 | Lind et al. | |
| 2005/0130746 | A1 | 6/2005 | Stephenson et al. | |
| 2005/0215325 | A1 | 9/2005 | Nguyen et al. | |
| 2006/0073900 | A1 | 4/2006 | Cole | |
| 2006/0183552 | A1 | 8/2006 | DiMichele | |
| 2007/0060387 | A1 | 3/2007 | Enzminger et al. | |

* cited by examiner

*Primary Examiner* — Ronald Laneau

(74) *Attorney, Agent, or Firm* — Weide & Miller, Ltd.

(57) ABSTRACT

A method of optimizing a number of gaming machines comprises providing a first number of gaming machines having a first appearance and configured to present at least one first game. Game play is monitored at the gaming machines and if the game play reaches a threshold level, a number of the gaming machines are changed to have a second appearance and configured to present at least one second game. Preferably, the appearance of the gaming machines is modified by changing certain door/frame coverings and/or the number or arrangement of visible components, permitting the gaming machine itself to be reused.

12 Claims, 7 Drawing Sheets

METHOD AND SYSTEM FOR CHANGING THE APPEARANCE OF GAMING MACHINES AS PART OF OPTIMIZING THE NUMBER OF GAMING MACHINES PRESENTING PARTICULAR GAMES

RELATED APPLICATION DATA

This application is a continuation-in-part of U.S. application Ser. No. 11/805,318, filed May 22, 2007 now U.S. Pat. No. 7,862,436, which is a continuation-in-part of U.S. patent application Ser. No. 11/205,839, filed Aug. 17, 2005 now abandoned, which claims priority to U.S. Provisional Application Ser. No. 60/615,774 filed Oct. 4, 2004.

FIELD OF THE INVENTION

The present invention relates to gaming machines and, more particularly, to gaming machine components and gaming machines which support multiple configurations.

BACKGROUND OF THE INVENTION

Gaming machines, especially those which are utilized to present wagering type games, have a wide variety of configurations. Currently, such machines are custom configured depending on the particular game or games which the machine is intended to present. For example, the machine may be configured to present a video-type wagering game, such as video poker. In that case, the machine will include a video display. The machine may be configured to present a game of slots and an associated bonus game. In that instance, the gaming machine may include a set of rotatable wheels along with a video display for displaying bonus game information.

In order to accommodate the various differing components for presenting these different games, the gaming machines for presenting those games are custom configured for mounting and containing the components.

In addition, it is generally desirable for gaming machines presenting different games to have different appearances. The difference in appearance is useful in aiding player in identifying particular machines. For example, by providing a gaming machine with a particular appearance, one company may distinguish their machines from another company's machines, enabling players to locate those machines.

Unfortunately, there is substantial cost associated with the development of a gaming machine. Significant resources must be expended to engineer the specific gaming machine configuration. Further, custom tooling and parts may need to be created to manufacture the machine. These and other factors increase the cost of producing gaming machines.

One problem with this prior art configuration is that a gaming machine is obsolete once the game it presents is not longer popular. A particular game may have a short popularity cycle or its popularity may drop very quickly after the game has been introduced. Because the gaming machines are custom-configured, however, once the game is not popular, the gaming machine is obsolete and is generally simply removed from the casino floor. Another completely new and custom configured-gaming machine that presents a different game is then introduced. However, this complete replacement of gaming machines is very expensive.

As one attempt to reduce the costs of manufacture and make gaming machines more versatile, the inventor herein invented a gaming machine which may be configured as either a reel-type gaming machine or a video-type gaming machine, as evidenced by U.S. Pat. No. 6,475,087. Other solutions to the above-stated problems have included creating generic gaming machines that are "server-based" and can thus present different games downloaded from the server. This solution, however, has the drawback that the gaming machine itself is generally generically configured and is not customized relative to a particular game and thus lacks substantial visual appeal. Also, because the gaming machine lacks any specific external configuration, players can not use the configuration of the gaming machine to readily identify or associate the gaming machine with a particular game. The present invention further addresses the above-stated problems and drawbacks.

SUMMARY OF THE INVENTION

One aspect of the present invention is a method and system for changing the appearance of gaming machines as part of optimizing the number of gaming machines that present different games in a casino or other gaming establishment.

In one embodiment of the invention, a gaming machine includes a housing defining an interior area in which gaming machine components may be located, and a door connected to the housing and moveable between a first position and a second position, the door in the first position generally closing an open portion of a front of the housing and the door in the second position permitting access through the open front portion to the interior area of the housing.

Various embodiments of the invention comprise a gaming machine door which may be arranged to have a variety of configurations and appearances.

In one embodiment, a door defines or comprises a component area which defines an opening and which is configured to accept one or more components of the gaming machine, a console area supporting one or more player input devices, and a lower panel area. In one embodiment, the gaming machine components which are located in the component area of the door are selected from a group including at least one display, a component panel, and a divider. One or more dividers may be used to separate, at least visually, individual components associated with the component area. Various components may be supported by the component panel, such as a media reader, keypad or the like. Preferably, the positions of the components within the component area, as well as their number, may be varied by the manner in which they are mounted to or associated with the door. The door preferably defines an opening at which the components are located, such as by having the display(s) mounted at the opening so as to be viewable by a player of the gaming machine.

In one embodiment, the console area is located below the component area and extends outwardly of a remainder of the door. The console area preferably supports a plurality of input devices such as buttons.

In a preferred embodiment, the lower panel area is defined by a lower panel mounted to the door, the lower panel movable between a closed position over an opening in the door and an open position. One aspect of the invention is a means for biasing the lower panel into its open and closed positions. In a preferred embodiment, this means comprises a piston configured to bias the lower panel towards its open position and at least one spring configured to bias the lower panel towards its closed position.

In one embodiment, the gaming machine housing has a top and a bottom and an opening from the top to the bottom at a front thereof. The door extends from the top to the bottom of the machine for enclosing that opening. The lower panel provides independent access to the interior of the machine through the door.

In accordance with another embodiment of the invention, a door comprises a door frame, a support panel, a bezel, and one or more frame covers. The door frame may have a top, bottom and opposing sides and define a main opening. The support panel spans the sides of the door frame and divides the main opening and door frame into top and bottom portions. The support panel may support a button panel and/or other player input devices or the like.

The bezel is located in the top portion and defines one or more openings for alignment with one or more display devices. The display device(s) may comprise one or more spinning reels or one or more video displays.

The frame covers may include an upper frame cover for location over the top portion of the door frame and a bottom or lower frame cover for location over the bottom portion of the door frame. The door may also include a bumper connected to the support panel.

As one aspect of the invention, the number of gaming machines that have a particular appearance and offer certain games may be optimized. A first number of gaming machines having a first configuration are provided. The first configuration preferably has a first appearance associated with the presentation of at least a first game. Game play at the first number of gaming machines having that first configuration is monitored. If the level of game play reaches a predetermined threshold, such as a reduced level of play relative to an initial level of play, one or more of the first number of gaming machine is reconfigured into a second configuration. The second configuration has a second appearance associated with the presentation of a second game.

After the reconfiguration, a reduced number of the gaming machines having a first configuration remain in play. If the game play level at those gaming machines remains steady, they may remain in use. If the game play level again drops to another threshold, one or more of the gaming machines may be reconfigured into another configuration. In this manner, the number of gaming machines having the first configuration and presenting the one or more first games is optimized until the number of gaming machines matches the desired demand for those machines/games.

At the same time, the "excess" gaming machines having the first configuration may be reconfigured into another configuration. This permits the gaming machines to be "reused" rather than having to discard those machines and replace them with entirely new custom build machines of another configuration. The reconfiguration of the gaming machines, including changing the appearance of the gaming machines, may be accomplished by changing various panels, coverings, the arrangement or number of components associated with a door/display area or otherwise, such as detailed above.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
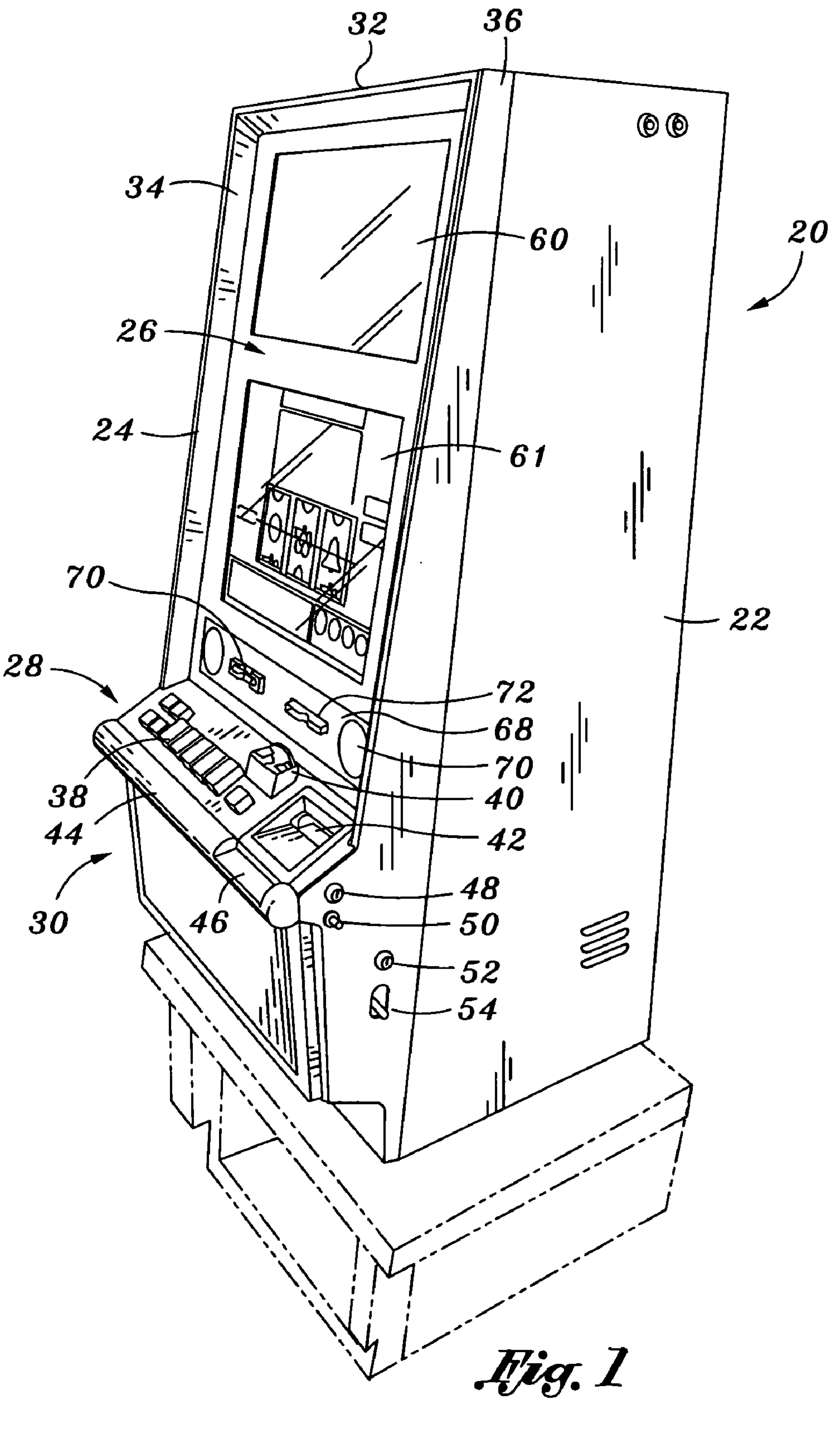
FIG. 1 is a perspective view of an embodiment gaming machine of the present invention arranged into a first configuration.

One embodiment of the invention is a gaming machine permitting multiple configurations. FIG. 1 illustrates one embodiment of such a gaming machine 20 in accordance with the present invention. The gaming machine 20 includes a housing or cabinet 22. The housing or cabinet 22 is configured to support and/or contain one or more gaming machine components.

The housing 22 may have a variety of configurations and be a variety of shapes and sizes. As illustrated, the housing 22 is configured so that the gaming machine 20 has an "upright" configuration. In this configuration, the housing 22 has a top, a bottom, a pair of opposing sides and a back (not visible).

A door 24 is located at a front of the housing 22. The door 24 is movable between a first, open position whereby access is permitted to an interior of the gaming machine 20, and a second, closed position (as illustrated in FIG. 1) in which access to the interior is generally prevented. In the embodiment illustrated, the entire front of the housing 22 is, when the door 24 is in it second position, closed by the door 24. In other embodiments, the door 24 could be smaller than the entire front of the housing 22, such that the door 24 allows access to only a portion of the interior of the housing 22, the remaining front portion of the housing closed by panels, housing wall members or the like.

Various embodiments of the invention comprise a gaming machine door which may be arranged to have a variety of configurations and appearances. One embodiment of a door which may be arranged into a variety of configurations will be described with reference to FIGS. 1-7. Referring to FIG. 1, the door 24 defines a component area 26, a button panel, mount or console area 28, and a lower panel 30. In a preferred embodiment, the component area 26 is positioned above the button panel 28, and the lower panel 30 is positioned below the button panel 28.

As illustrated, the component area 26 is a space between the button panel 28 and a periphery of the door 24, that periphery having a top portion 32 and side portions 34,36. In one embodiment, the component area 26 is generally rectangular in shape, being about twelve to twenty (12-20) inches in width and about twenty-four to thirty-six (24-36) inches in height.

As described in more detail, the component area 26 is configured to accept a plurality of gaming machine components. Preferably, one or more of the components are mounted to the door 24, and face outwardly towards a player of the game. The components may include, but are not limited to, displays such as LCD, LED, CRT, plasma, DLP and others, keypads, media printers (such as ticket printers and bar code printers) and readers (such as bill validators, ticket readers, smart card and magnetic stripe card readers), speakers and other devices.

Preferably, the button panel 28 comprises an outwardly extending support portion of the door 24. As illustrated, the button panel 28 includes an outwardly extending, somewhat downwardly sloping support surface. Preferably, one or more components of the gaming machine 20 are supported or associated with the button panel 28. In one embodiment, these components include one or more buttons 38 or other devices for accepting player input, a coin acceptor 40 and a media reader 42 (such as a bill validator). Other or additional components may be provided. In particular, as detailed below, the components which are associated with the button panel 28 may vary depending upon the components which are located elsewhere on the machine and the desired configuration of the machine, among other factors.

In one embodiment, a bumper or cushion 44 is provided at front edge of the button panel 28. Preferably, the bumper 44 comprises a cushioned or somewhat compressible member. In one embodiment the bumper 44 may be constructed of a foam material covered by a protective coating or cover.

In a preferred embodiment, the bumper 44 extends from one side of the button panel 28 to the other, thus providing a cushion at the front or outer-most extending portion of the button panel 28. As illustrated, a cut-out or trough area 46 may be provided in the bumper 44 in order to facilitate access to the media reader 42. As illustrated, this cut-out or depression 46 is located in a top portion of the bumper 44 in alignment with a guideway portion of the media reader 42.

The lower panel 30 preferably covers one or more gaming machine 20 components located there behind, such as within the housing 22 of the gaming machine 20. Greater details of the panel 30 are provided below.

In one embodiment, the lower panel 30 may include a latching and/or locking mechanism which controls movement of the panel 30 between an open and closed position. In one embodiment, a locking mechanism includes a key-actuated lock 48. A latching mechanism includes a movable lever 50. In a preferred configuration, the movement of the lever 50 may be utilized to unlatch the panel 30, permitting its movement from a closed to an open position. Preferably, movement of the lever 50 is controlled by the lock 48. When the lock 48 is locked, then the lever 50 can not be actuated and the panel 30 can not be opened. As illustrated the lock 48 and lever 50 are preferably mounted to the door 24.

Movement of the door 24 from the closed to the open position may be similarly controlled. As illustrated, a door lock 52 and lever 54 are preferably mounted to the housing 22.

Advantageously, the gaming machine 20 of the invention may be assembled so that the gaming machine 20 has a variety of different configurations. Preferably, the gaming machine 20 may also be converted between a first and at least one second (or other) configuration. In this manner, the gaming machine 20 may be custom configured to include specific desired components and to have a specific desired appearance, from among many different possible combinations of components and many possible different possible appearances.

In a preferred embodiment, the ability to configure or convert the gaming machine 20 is facilitated by the ability to arrange components relative to the door 24, such as within the component area 26. In addition, however, other components may be associated with the button panel 28. As described herein, the configuration of the door of a gaming machine may be changed, including the appearance thereof (such as the shape, superficial effects or the like), the components associated therewith (such as displays, dividers, or the like), or the components with which the door 24 is associated or cooperates (such as displays mounted to the gaming machine housing which the door closes over).

FIG. 1 illustrates one example configuration of the gaming machine 20. As illustrated, in this embodiment, two displays 60,61 are located in the component area 26, as well as a component bar or panel 68. In the embodiment illustrated, the component bar or panel 68 supports components of a player tracking device, including speakers 70, a media reader 72 (such as a magnetic stripe card reader) and a media printer 74 (such as ticket printer). Additional details of configurations of the gaming machine and the construction of the gaming machine are provided below.

FIGS. 2-7 illustrate additional example configurations of a gaming machine 20 in accordance with the present invention. It will be appreciated that these figures illustrate just a few of the possible configurations for the gaming machine.

Figure 2:
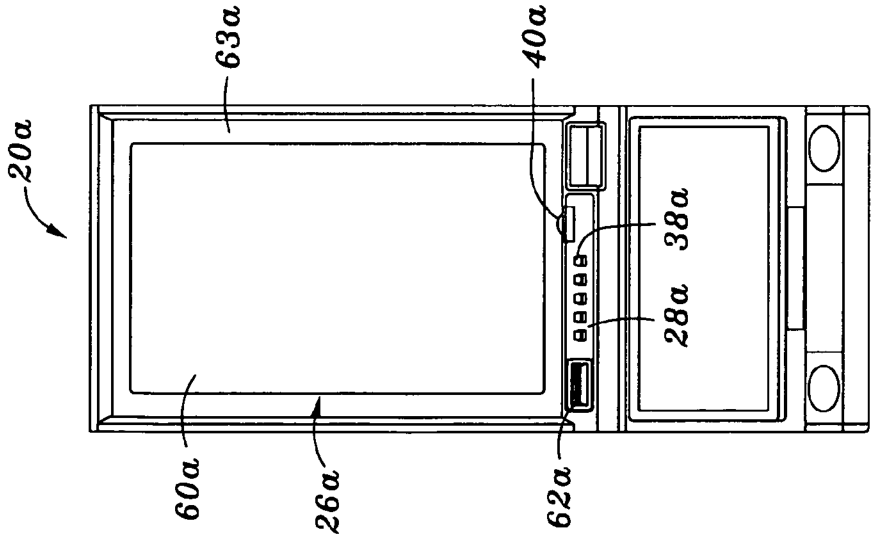
FIG. 2 is a perspective view of an embodiment gaming machine of the present invention arranged into a second configuration.

FIG. 2 illustrates an embodiment of a gaming machine 20*a* in which a single display 60*a* is located in the component area 26*a* and is configured to present game and other information to a player/user of the machine 20*a*. In one embodiment, the display 60*a* is a thirty (30) inch LCD display, which display occupies substantially all of the component area 26*a*.

In a preferred embodiment, the button panel 28*a* of this machine supports a plurality of input buttons 38*a*, a media reader 62*a* (such as a magnetic stripe card reader or smart card reader), and a coin acceptor 40*a*. Of course, the button panel 28*a* might support other components.

Figure 3:
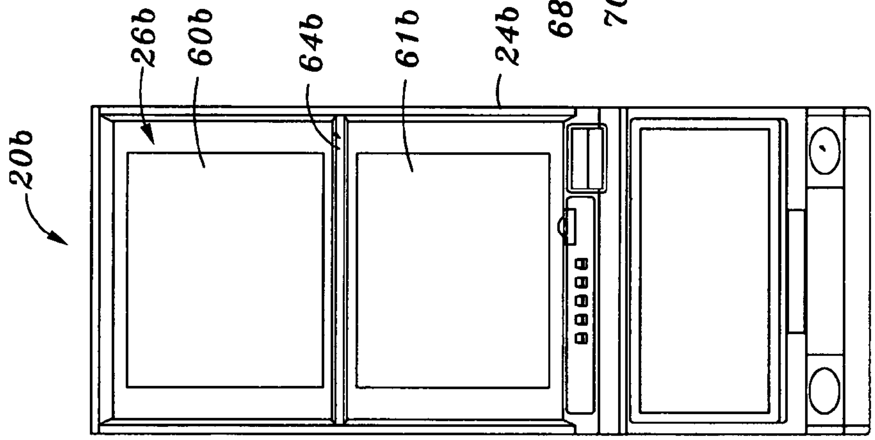
FIG. 3 is a perspective view of an embodiment gaming machine of the present invention arranged into a third configuration.

FIG. 3 illustrates yet another configuration of a gaming machine 20*b* in accordance with the invention. In this embodiment, a first display 60*b* and a second display 61*b* are located in the component area 26*b*. In this embodiment, the first and second displays 60*b*,61*b* are generally of the same size, such as nineteen (19) inch LCD panels.

Preferably, the displays 60*b*,61*b* are separated by a divider 64*b*. In one embodiment, the divider 64*b* is a raised bar which extends between the opposing sides of the periphery of the door. The periphery of the door may comprise a raised beveled member which extends outwardly to "frame" the component area 24*b*. The divider 64*b* may be similarly configured, so as to have the same appearance. In a preferred embodiment, the divider 64*b* is selectively connectable to the door 24*b*. In this manner, the position of the divider 64*b* may be changed. However, because the divider 64*b* has the same appearance as the peripheral portion of the door 24*b*, the divider 64*b* makes it appear that the door is actually constructed to have two different areas, one for each display.

Of course other divider configuration may be provided. In one embodiment, the divider may be mounted from inside the door and be a bar or other member extending across the opening comprising the component area. Preferably, the divider or dividers may be mounted to the door in a variety of locations to facilitate the multiple configurations of the gaming machine. In one embodiment, mounting brackets supporting multiple divider mounting positions may be provided.

This configuration gaming machine 20*b* has particular utility in the situation where two different games are to be presented to a player. The gaming machine 20*b* may, however, be configured to present a wide variety of information on either or both displays 60*b*,61*b*.

Figure 4:
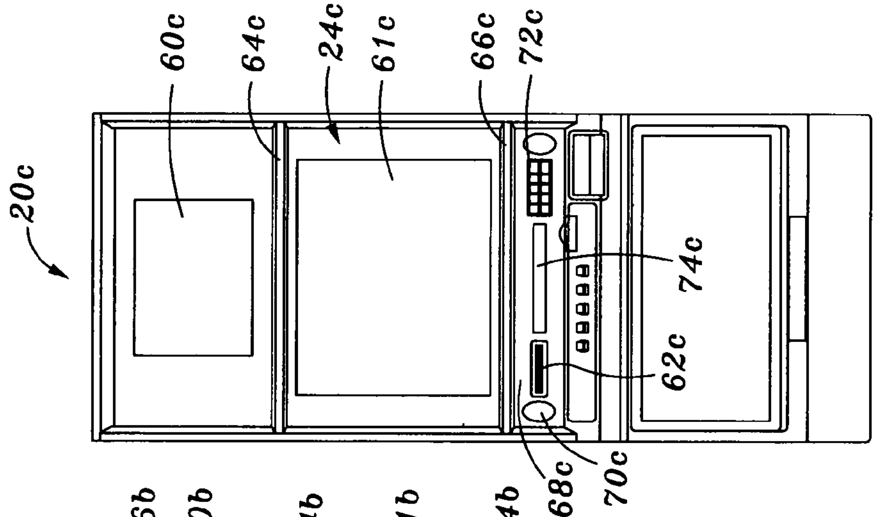
FIG. 4 is a perspective view of an embodiment gaming machine of the present invention arranged into a fourth configuration.

FIG. 4 illustrates yet another configuration of a gaming machine 20*c* in accordance with the invention. In this configuration, the gaming machine 20*c* again includes a first display 60*c* and a second display 61*c* located in the component area 24*c*. The size and configuration of these displays 60*c*,61*c* may vary. As illustrated, the first display 60*c* is smaller than the second. For example, the first display 60*c* may be a twelve (12) inch LCD panel and the second display 61*c* may be an eighteen (18) inch LCD panel. Of course, the displays may be of a variety of shapes and/or sizes.

In this embodiment, the component area 24*c* includes one or more non-display gaming machine components. In one embodiment, one or more of those components may be associated with a component panel 68*c* which is located in the component area 24*c*. The component panel 68*c* supports and presents one or more components. In one embodiment, the non-display components may comprise various player input device or other gaming machine components such as one or more speakers 70*c*, a media reader 62*c* (such as a ticket reader, magnetic stripe card reader or other readers) and/or a keypad 72*c*. The component panel 68*c* may support one or more of those non-display components and/or other components, such as a small display 74*c*.

In a preferred embodiment, the displays 60*c*,61*c* are separated from one another by a first divider 64*c*, and the component panel 68*c* is separated from the displays 60*c*,61*c* by a second divider 66*c*.

Figure 5:
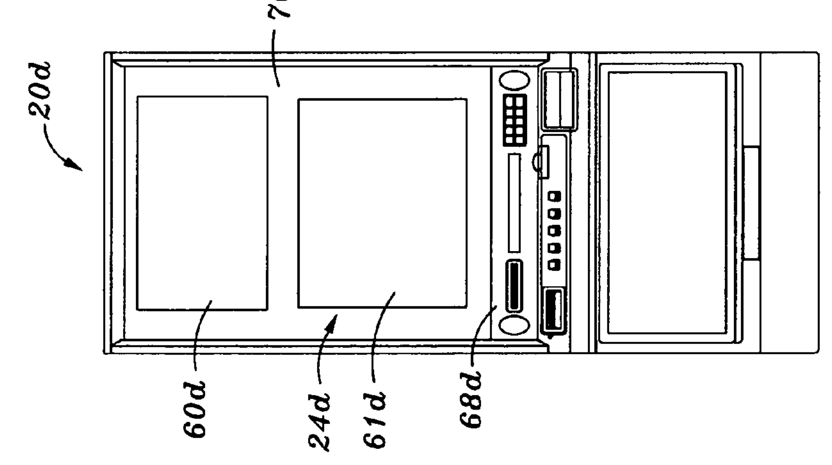
FIG. 5 is a perspective view of an embodiment gaming machine of the present invention arranged into a fifth configuration.

Yet another embodiment of a gaming machine 60*d* is illustrated in FIG. 5. This embodiment machine 20*d* is similar to that illustrated in FIG. 4, except that the displays 60*d*,61*d* and component panel 68*c* are not separated from one another by dividers. Instead, the displays 60*d*,61*d* are surrounded by a bezel 76*d*. The bezel 76*d* preferably separates the displays 60*d*,61*d* and component panel 68*d* from one another visually.

Figure 6:
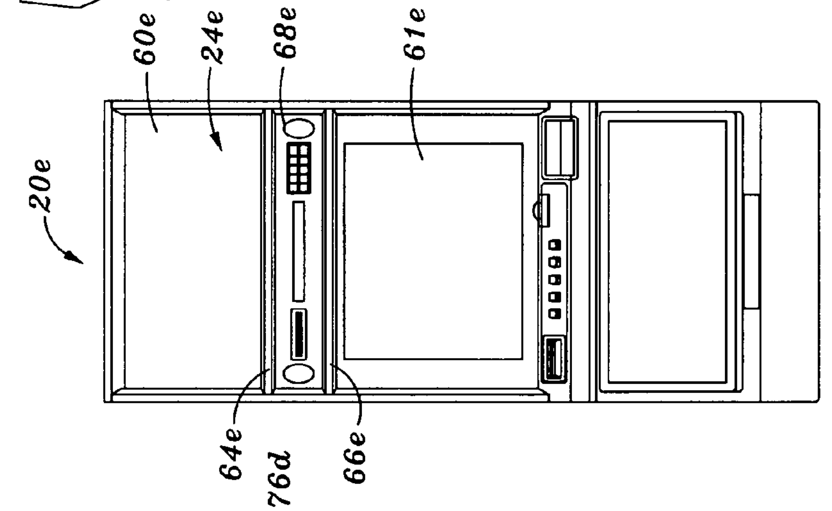
FIG. 6 is a perspective view of an embodiment gaming machine of the present invention arranged into a sixth configuration.

Yet another embodiment gaming machine 20*e* is illustrated in FIG. 6. In this embodiment, the component area 24*e* includes a first display 60*e*, a component bar or panel 68*e*, and then a second display 61*e*. These components are again preferably separated by dividers 64*e*,66*e*.

Figure 7:
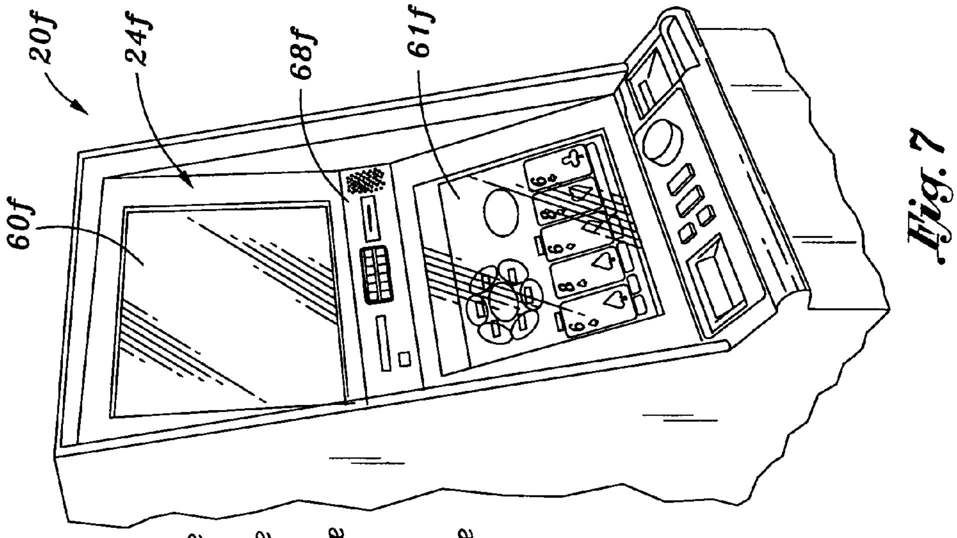
FIG. 7 is a perspective view of an embodiment gaming machine of the present invention arranged into a seventh configuration.

Another embodiment gaming machine 20*f* is illustrated in FIG. 7. This embodiment gaming machine 20*f* is similar to that illustrated in FIG. 6. In particular, a component area 24*f* thereof includes first and second displays 60*f*,61*f* separated by a component bar or panel 68*f*. In the illustrated configuration, one or more brackets are utilized to connect the displays to the machine 20*f* in a manner by which they are tilted or angled. In one embodiment, as illustrated in FIGS. 1-6, the displays may be mounted so that they are generally vertically extending. As illustrated in FIG. 7, the displays may also be mounted so that are located in one or more planes which are offset from vertical.

In one embodiment, as illustrated in FIG. 7, a first or top display 60*f* may be mounted so as to tilt forward or downwardly towards the eyes of a player which are normally located below the height or level of the display. The second or bottom display 61*f* may be mounted so as to tilt backwardly or upwardly towards the eyes of a player which may be located at or above the height of this display. In this manner, the displays 60*f*,61*f* lie in planes which intersect at a point behind them. The displays 60*f*,61*f* could be mounted in other planes. The particular mounting illustrated is advantageous where the machine is to be situated such that the player's level line of sight is directed to a point generally between the displays 60*f*,61*f*, so that when the player is looking down towards the lower display 61*f*, that display is tilted up towards the player and so that when the player is looking up towards the top display 60*f*, that display is tilted down towards the player.

As described, the displays 60*f*,61*f* may be mounted to a door of the gaming machine 20*f* with one or more brackets into the illustrated position. In one embodiment, the component bar 68*f* is still mounted so as to be generally vertically extending.

Once again, it is emphasized that the embodiments of the gaming machine illustrated in FIGS. 1-7 are examples of various configurations of the gaming machine permitted in accordance with the invention. Many other configurations are permitted. For example, in one embodiment, the display may comprise a static graphical display panel, such as a painted glass panel. Such a panel, which is often back-lit, may be located in a first portion of the component area and one or more electronic displays may be located at other portions of the component area.

Additional details of the gaming machine 20 will now be described with reference again to FIGS. 1-7. As indicated, one or more displays and other components may be associated with the component area 26 of the gaming machine 20.

In a preferred embodiment, components such as the displays, component panels and the like are mounted to the door 24. In one embodiment, the component area 26 comprises a display window or opening, that window or opening framed by the door. The displays and other components are preferably connected to the door so as to be viewable through the opening in the door. The components could also be located at the front of the door for access/viewing. In such a configuration, the components need not be aligned with an opening in the door.

One embodiment of a mounting configuration for a display, such as an LCD panel, is detailed in U.S. Pat. No. 6,860,814 which is incorporated by reference in its entirety herein. As disclosed therein, such panels may be mounted to a rear of the door 24 so as to be visible through the opening comprising the component area 26.

In one embodiment, glass or a similar suitable covering may be located over the displays for protecting the surfaces of the displays. For example, in the embodiment gaming machine 20*a* illustrated in FIG. 2, the entire opening or area defined by the component area 26 may be filled or covered with glass or other transparent protective member. In the example illustrated in FIG. 4, glass may cover the displays 60*c*,61*c*, but not the component panel 68*c*.

As indicated, a bezel may be located around the display or displays or other components, for setting those components off from one another visually. For example, the display 60*a* of the gaming machine 20*a* illustrated in FIG. 2 may have a bezel 63*a* around its periphery. The bezel 63*a* may comprise a printed portion of the covering glass, such as a black painted border, or may comprise a physical element such as a frame element. The frame element may be mounted to the door 24*a* or the like, such as in front of the display 60*a* and/or glass or other covering over the display.

In the case of the gaming machine 20*b* illustrated in FIG. 3, there may be more than one bezel, or there may be a single bezel, with the divider 64*b* extending over the bezel.

It will be appreciated that the configuration of elements associated with the button panel 28 may vary, including as dependent upon what components are located in the component area 26. For example, if a media reader, such as magnetic-stripe card reader or smart card reader, is located in the component area (such as associated with a component panel, as illustrated in FIG. 4), then that component may not need to be located at the button panel 28 or elsewhere on the machine. As indicated, the gaming machine may be configured to support other components. For example, the gaming machine might be configured as a reel-type machine and include one or more reels which are mounted for display in the component area (such as mounted to the door or there behind for viewing through the opening).

Advantageously, this aspect of the invention provides a "generic" gaming machine structure which allows for multiple component configurations, thus allowing the gaming machine to be "customized." The embodiment gaming machine thus substantially reduces the cost associated with production of gaming machines having a variety of different configurations. At the same time, the gaming machine supports a nearly limitless number of configurations. This allows production of various gaming machines which have unique appearances.

The number of appearances of the gaming machine may be further enhanced with superficial effects. For example, the door perimeter, dividers and the like may be chrome or gold plated or otherwise colored in a various shades, and the lower panel may include various graphics, among other things. This further enhances the ability to make the gaming machine distinct in appearance. For example, various configurations of the gaming machine may be developed for "themed" games, and the graphics and the like may be provided to match and promote that theme.

Another embodiment of the invention will be described with reference to FIGS. 8-12. These figures show additional embodiments of the invention wherein the configuration of a gaming machine door and/or the components associated therewith, may be changed.

Figure 8:
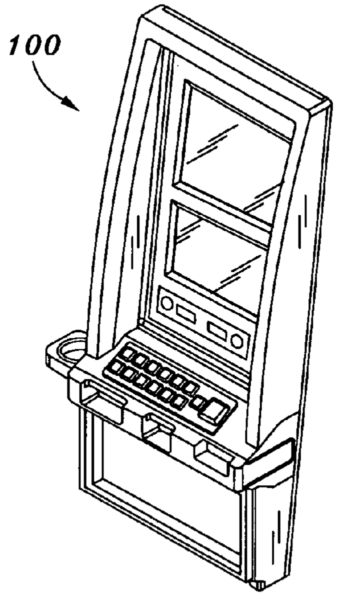
FIG. 8 is a perspective view of a gaming machine door assembly in accordance with another embodiment of the invention.
Figure 9:
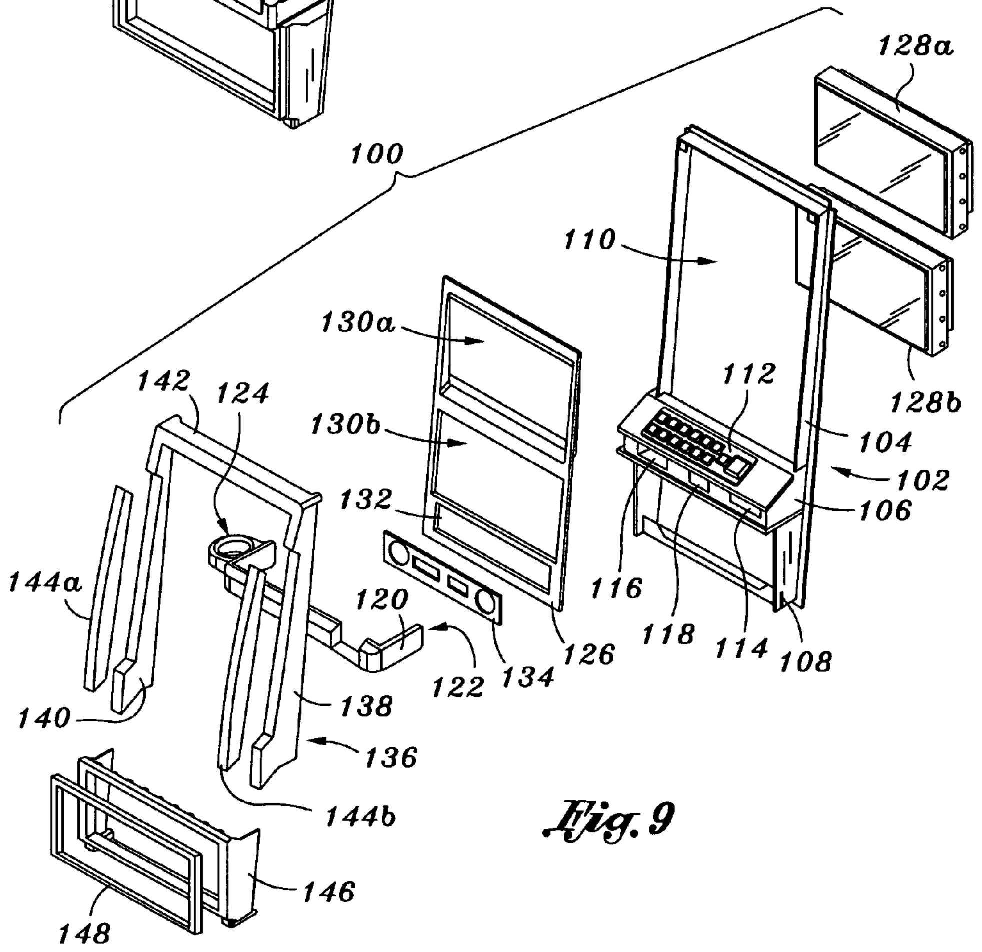
FIG. 9 is an exploded view of the door assembly illustrated in FIG. 8.

FIG. 8 illustrates a gaming machine door or door assembly 100 in accordance with another embodiment of the invention. The configuration of the door 100 will be described with reference to FIG. 9, which shows the door in exploded view. In one embodiment, the door 100 is constructed from a number of components, the configurations of which allow the configuration or appearance of the door 100 to be varied.

As illustrated, the door 100 includes a door frame 102. In one embodiment, the door frame 102 comprises a support structure for one or more other components. The door frame 102 may be constructed from plastic or other material. In one embodiment, the door frame 102 is preferably configured to conduct electricity and be sufficiently strong and rigid to support components, and therefor may be constructed of metal.

In one embodiment, the door frame 102 preferably comprise or defines a periphery of the door, namely a pair of sides and a top and bottom thereof. The frame 102 extends around or defines a main or central opening. The door frame 102 generally has a front and a rear, corresponding to the position of the door when connecting to a housing of a gaming machine.

In one embodiment, the door 100 includes a support panel 106. The support panel 106 preferably extends between the opposing sides of the door frame 102 and divides the door frame 102, including the main opening, into a top or upper portion 104 and a bottom or lower portion 108. It will be appreciated that the position that the support panel 106 is connected to the door frame 102 generally determines the relative sizes of the upper and lower portions 104, 108. Thus, by changing or adjusting the position of the support panel 106, the appearance of the door 100, and thus a gaming machine with which the door is associated, may be varied.

The shapes and sizes of these various portions of the door frame 102 may vary, including based upon the desired configuration of the gaming machine. In one embodiment, the top portion 104 and bottom portion 108 are configured to accept one or more components or other elements therein. In this regard, the top portion 104 defines a component area 110.

The support panel 106 comprises a support for various components of the gaming machine. In one embodiment, the support panel 106 extends the width of the door and outwardly thereof, such as for supporting one or more buttons. In one embodiment, a button panel 112 which includes or supports one or more buttons or player input devices is mounted to the support panel 106. In other embodiments, the buttons or other input devices could be mounted directly to the support panel 106.

The button panel 112 may have a variety of configurations. In a preferred embodiment, the button panel 112 is configured to be electrically conductive and is connected to the door frame 102 in a manner providing an electrically conductive path there between.

In one embodiment, one or more components may be associated with a gaming machine so as to be located behind the support panel 106 when the door 100 is in a closed position. Alternatively, or in addition, one or more components might be mounted directly to the door 100. For example, a bill or currency validator might be mounted to the door 100. In one embodiment, the support panel 106 may define an opening 114 there through in alignment with an opening of the bill validator. The support panel 106 might similarly define an opening 116 corresponding to a card reader and an opening 118 corresponding to a ticket printer. Of course, the specific configuration of the support panel 106 might vary depending upon the variety of components which the gaming machine includes.

In one embodiment, the door assembly 100 may include a bumper 120. The bumper 120 may be configured to be located at the periphery of the support panel 106. In one embodiment, the support panel 106 may define a recessed area for accepting a portion of the bumper 120. The bumper 120 may comprise a cushioned or otherwise energy absorbing or soft member. In one embodiment, the bumper 120 may be molded.

As illustrated, the bumper 120 has a middle portion and opposing first end 122 and second ends 124. The first and second ends 122,124 extend generally perpendicular to the middle portion. As illustrated in FIG. 8, when mounted to the support panel 106, the bumper 120 is preferably located at a front or forward position of the support panel 106. In one embodiment, the first and second ends 122,124 thereof extend around the sides of the support panel 106.

The configuration of the bumper 120 may vary. In one embodiment, as illustrated, a cup holder is located at the second end 124 thereof. Of course, the bumper 120 need not include a cup holder or it might include more than one cup holder. As also illustrated, the bumper 120 may define one or more cut-outs or similar areas for alignment with one or more of the openings in the support panel 106.

In a preferred embodiment, the bumper 120 is selectively connectable to the support panel 106. In this manner, bumpers of different color, shape or the like may be associated with the frame 102 in a manner allowing the configuration of the door assembly 100 to be varied.

In one embodiment, one or more display devices may be associated with the door. In one embodiment, the one or more display devices may be directly mounted to the door frame 102. In other embodiments, the door could be configured to simply be associated with such devices, such as by having those devices mount to a gaming cabinet with which the door is associated and the door being located adjacent thereto when the door is in a closed position.

The display devices may vary, such as depending upon the configuration of the gaming machine. For example, the display devices may comprise video displays such as plasma, LCD, LED, CRT or the like, or one or more spinning or rotating reels, wheels or other devices.

In one embodiment, the door assembly 100 includes a bezel 126. The bezel 126 is preferably selectively connectable to the door frame 102. The bezel 126 may be associated with the top portion 104 of the frame 102, so as to be located in the component area 110.

The particular shape and size of the bezel 126 may vary, including depending upon the desired appearance of the door assembly 100 and the particular components with which the bezel is to be associated. In one embodiment, the bezel 126 defines at least one opening through which a display device may be viewed at one or more times. In the example illustrated in FIGS. 8 and 9, the bezel 126 is configured to be associated with two video displays 128*a*, 128*b*. As such, the bezel 126 comprise a frame which defines two display openings 130*a*,130*b*. In one embodiment, the openings 130*a*,130*b* are located one above the other. In this configuration, the first and second displays 128*a*,128*b* are configured to be viewed through the openings 130*a*,130*b* of the bezel 126.

In a preferred embodiment, the displays 128*a*,128*b* may be mounted to the door frame 102 so as to be part of the door assembly 100. In this configuration, the displays 128*a*,128*b* may move with the door when it is opened and closed relative to a gaming machine.

Figure 10:
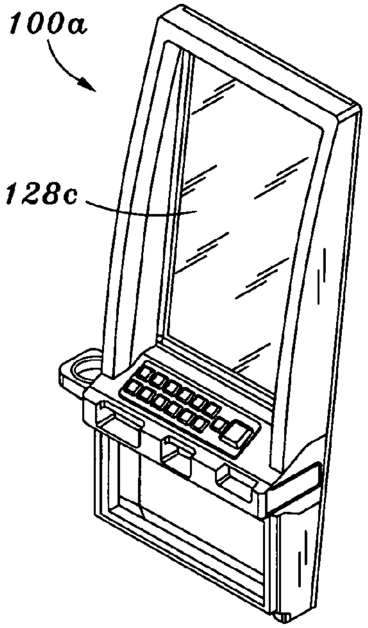
FIG. 10 is a perspective view of a gaming machine door assembly configured in accordance with another embodiment of the invention.

It will be appreciated that the configuration of the bezel 126 may vary depending upon the desired configuration of the door assembly 100. For example, the bezel 126 may define only a single display opening or it might define more than two openings. FIG. 10, for example, illustrates a door assembly 100*a* in which the bezel defines a single opening for viewing of a single display 128*c* there through. As illustrated, this particular door assembly 100*a* has a different appearance and different configuration (utilizing a single display in a "portrait" configuration rather than one or more displays in "landscape" configuration).

Referring again to FIG. 9, the bezel 126 may define other openings. For example, the bezel 126 may define a component opening or area 132. One or more components may be configured to align with or be located in this opening. For example, a component panel 134 may be located in this area. The component panel 134 may be configured to cooperate with or have associated therewith, one or more components. Such components might comprise one or more speakers, one or more displays, a card or other media reader and/or other devices.

In the configuration illustrated, the component panel 134 is located below the display openings 130*a*,130*b*. However, the bezel 126 could have a variety of other configurations, such as where the component panel 134 is located between or above those openings.

In a preferred embodiment, the bezel 126 is constructed of metal or other electrically conducting material. Further, the bezel 126 is preferably connected to the door frame 102 so that an electrically conductive path is provided there between. The bezel 126 could be constructed of other materials, however.

In one embodiment, the door assembly 100 includes an upper frame cover 136. Preferably, the upper frame cover 106 is located over a front portion of the door frame 102, thus covering or enclosing that portion of the door frame 102.

In order to permit the appearance of the door assembly 100 to be varied/customized, the configuration and/or appearance of the upper frame cover 136 may vary. In one embodiment, the upper frame cover 136 is configured to extend around the top portion 104 of the door frame 102. The upper frame cover 136 thus includes a first leg 138, a second leg 140 and a top portion 142, corresponding to the same portions of the top portion 104 of the door frame 102.

The upper frame cover 136 may be configured to be removably attached to the door frame 102, such as by being press-fit into engagement therewith, or by being configured to attach thereto with one or more fasteners (such as tabs which extend therefrom into mating holes or slots in the door frame, or with screws or the like).

The upper frame cover 136 may be constructed from a variety of materials. For example, the upper frame cover 136 may be constructed of plastic, such as in a molding process. Preferably, the upper frame cover 136 is configured to define an electrically conductive pathway from an exterior thereof to the door frame 102. In one embodiment, at least a portion of the upper frame cover 136 may be plated with metal or another conductive material. In other embodiments, conductive pathways may be defined through the upper frame cover 136 (such as by embedding conductive particles or material therein).

The upper frame cover 136 may have a variety of shapes and exterior treatments, such as colors. In one embodiment, the upper frame cover 136 may be constructed from more than one element, or have other elements associated therewith. As illustrated, inserts 144*a*,144*b* may be connected to each leg 138,140 of the upper frame cover 136. In this manner, the upper frame cover 136 may be configured to have one appearance without the inserts 144*a*,144*b* and may have a variety of other configurations depending upon the inserts 144*a*,144*b* associated therewith. The shape and size of the inserts 144*a*,144*b* may vary.

In one embodiment, one or more components or elements may be associated with the bottom or lower portion 108 of the door frame 102. In one embodiment, the lower portion 108 of the door frame 102 may be utilized as a display area. One or more electronic or other displays, such as back-illuminated glass or other signage, may be located in this area. Such displays or signage may be supported by the door frame 102. In other embodiments, the door assembly 100 could be configured to cooperate with such elements (such as by being closed over those elements).

In one embodiment, the door assembly 100 includes a lower frame cover 146. Preferably, the lower frame cover 146 is mounted over a portion of the front of the door frame 102 to cover the door frame. The lower frame cover 146 may be similar to the upper frame cover 136, except configured to be located at the lower portion 108 of the door frame 102. As with the upper frame cover 138, the configuration of the lower frame cover 146 may be varied in order to change the appearance thereof. For example, the shape and/or color or texture thereof may be varied.

As illustrated, a bezel or trim element 148 may be connected to the lower frame cover 146. This element 148 might be chrome or have other appearances.

FIG. 8 shows the door assembly 100 as configured in accordance with one embodiment of the invention. As illustrated, this configuration includes two video displays. FIG. 10 illustrates another configuration door assembly 100*a* including only a single video display. As indicated above, however, the principles of the invention may be applied so as to generate door assemblies having a wide variety of appearances.

Figure 12:
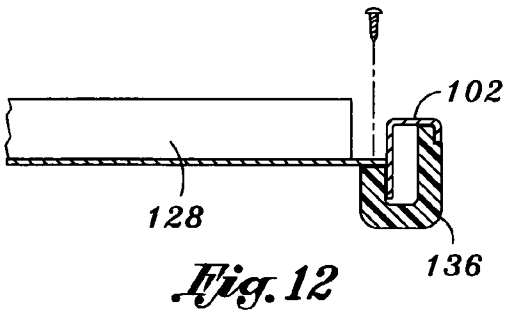
FIG. 12 illustrates a display mounting configuration in accordance with the present invention.

As indicated above, in one embodiment, one or more displays may be mounted to the door frame 102. FIG. 12 illustrates one embodiment of a display mounting arrangement. As illustrated, the video display 128 mounts to the upper frame cover 136. For example, the upper frame cover 136 may be mounted to the door frame 102 and have a portion or face which extends into the component area defined by the door frame 102. The display 128 may mount to this face or portion of the upper frame cover 136.

Figure 11:
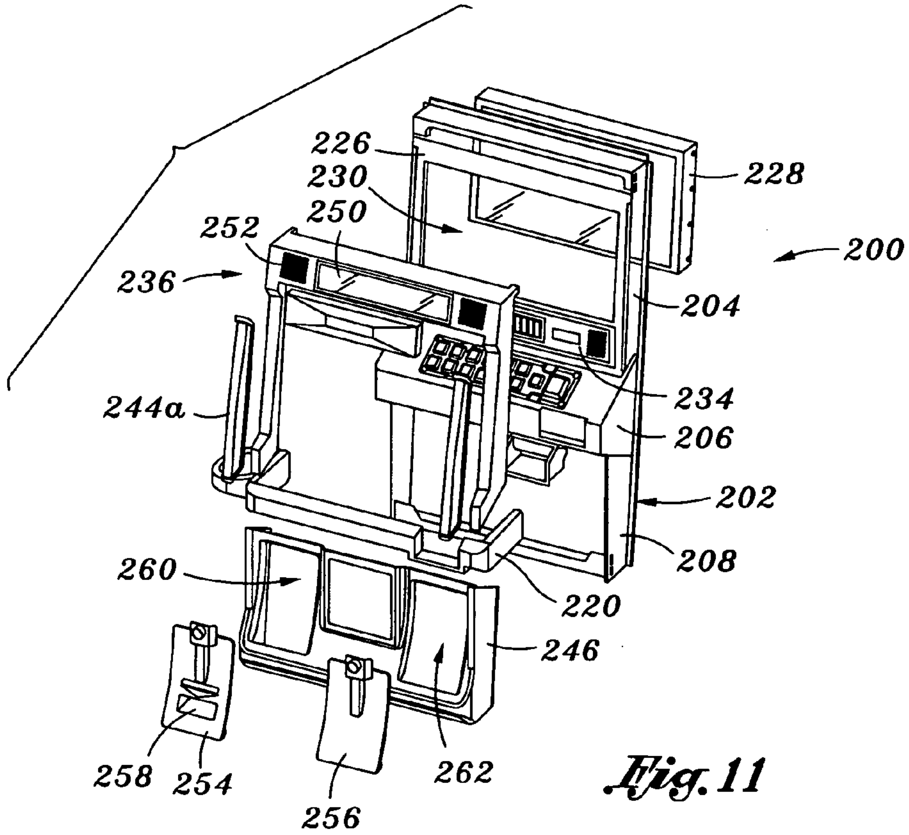
FIG. 11 is an exploded view of the door assembly in accordance with another embodiment of the invention.

FIG. 11 shows yet another configuration of a door assembly 200. In this embodiment, like reference numbers have been given to like elements to those of the embodiment illustrated in FIG. 9, for ease of reference.

Once again, the door assembly 200 includes a door frame 202. The door frame 202 is similar to that above, including an upper portion 204, a component panel 206 and a lower portion 206. Further, the door assembly 200 includes a bezel 226 which defines a display opening 230 for alignment with a display 228. As illustrated, the bezel 226 includes a component portion or panel 234.

The door assembly 200 also includes a bumper 220 mounted to the panel 206, as well as an upper frame cover 236 and a lower frame cover 246. Once again, inserts 244*a*,244*b* may be provided for mating with the upper frame cover 236.

In this configuration, one or more components are associated with the upper frame cover 236. As illustrated, one or more displays 250, speakers 252 or the like may be mounted to or supported by the upper frame assembly. As illustrated, these components are located in the top portion of the upper frame cover 236. They might be located in other areas.

FIG. 11 also illustrates another configuration of a lower frame cover 246. In this configuration, the lower frame cover 246 does not define a single main opening or display area. Instead, the lower frame cover 246 includes a first movable panel 254 and a second movable panel 256. These panels 254,256 may be movably connected to the lower frame cover 246 or otherwise be mounted to move relative to the door frame 202. These panels 254,256 may selectively control access through corresponding openings 260,262 in the lower frame cover 246.

In one embodiment, a locking mechanism may be provided for selectively locking each panel 254,256 into its closed position. The panels 254,256 may have a variety of sizes and shapes. As illustrated, at least one of the panels 254 might, for example, define a slot 258 through which tickets or other media or elements may be dispensed.

In accordance with a method of the invention, a gaming machine door may be assembled into a variety of configurations. In one embodiment, a support panel is connected to a door frame. The position of the support panel may be adjusted to define top and bottom portions of the door frame. A bezel is connected to the door frame along with upper and lower frame covers. The door may be connected to a housing of a gaming machine, such as via one or more hinges so as to rotate between open and closed positions.

In accordance with the invention, a gaming machine may advantageously have various configuration for a variety of purposes, while still having the same basic design and employing the same basic components, thus substantially lowering the cost of manufacture. For example, the same gaming machine might be configured for two different casinos. In a high end market, various components of the gaming machine/door might be plated with gold or a similar precious metal to give the machine an expensive appearance. In a lower end market, various of the components of the gaming machine/door may be molded from plastic or the like to keep the cost of the machine lower.

The same principles permit the gaming machine to be configured for different purposes. For example, the gaming machine might be configured for a traditional casino market, and thus have a traditional appearance. On the other hand, the machine might be configured to have an appearance of a lottery or arcade unit.

In a preferred embodiment, the electrically conductive paths which are defined between the components and to ground preferably have a lower resistance than other potential electrical paths. In this manner, an electric charge is most likely to follow the path defined through and/or between the components to ground, rather than other paths, such as via wiring to the gaming machine controller or the like.

In one embodiment, various components of the machine, such as a bill validator or the like, may be mounted to the door of the gaming machine using a metal bezel. Such a bezel may add to the rigidity or stiffness of the door, as well as provide an additional grounding path to the door (such as to the door frame). For example, the bill validator may be mounted to a bezel which is mounted to the back of the door frame.

In accordance with prior gaming machines, many components (such as bill validators, lights, and the like) were AC powered. These components were fairly insensitive to electric shock. However, in accordance with one embodiment of the invention, various of the components of the gaming machine may be DC powered. While these components have the advantage of using much less power, a problem has arisen that these components are much more sensitive to electric shock. In accordance with the present invention, the gaming machine is configured to prevent such shock from traveling to those components, solving this problem.

A variety of features of the invention will now be appreciated from FIGS. 8-11. These figures illustrate a door assembly which permits the configuration of a gaming machine or similar device to be customized. In particular, the appearance of the gaming machine may be changed by changing the configuration or appearance of the door including one or more of: (1) changing the location of the support panel (by moving the panel up or down, the areas above and below the support panel change sizes); (2) changing the bezel and associated components (to include one display, more than one display, a component area, such areas above or below the display(s), etc.); (3) changing the shape or appearance of the bumper; (4) changing the trim, color or other aesthetics of the door; (5) changing the one or more components located in the lower area (such as from a back-illuminated panel to a video display to a ticket printer, etc.).

Figure 13:
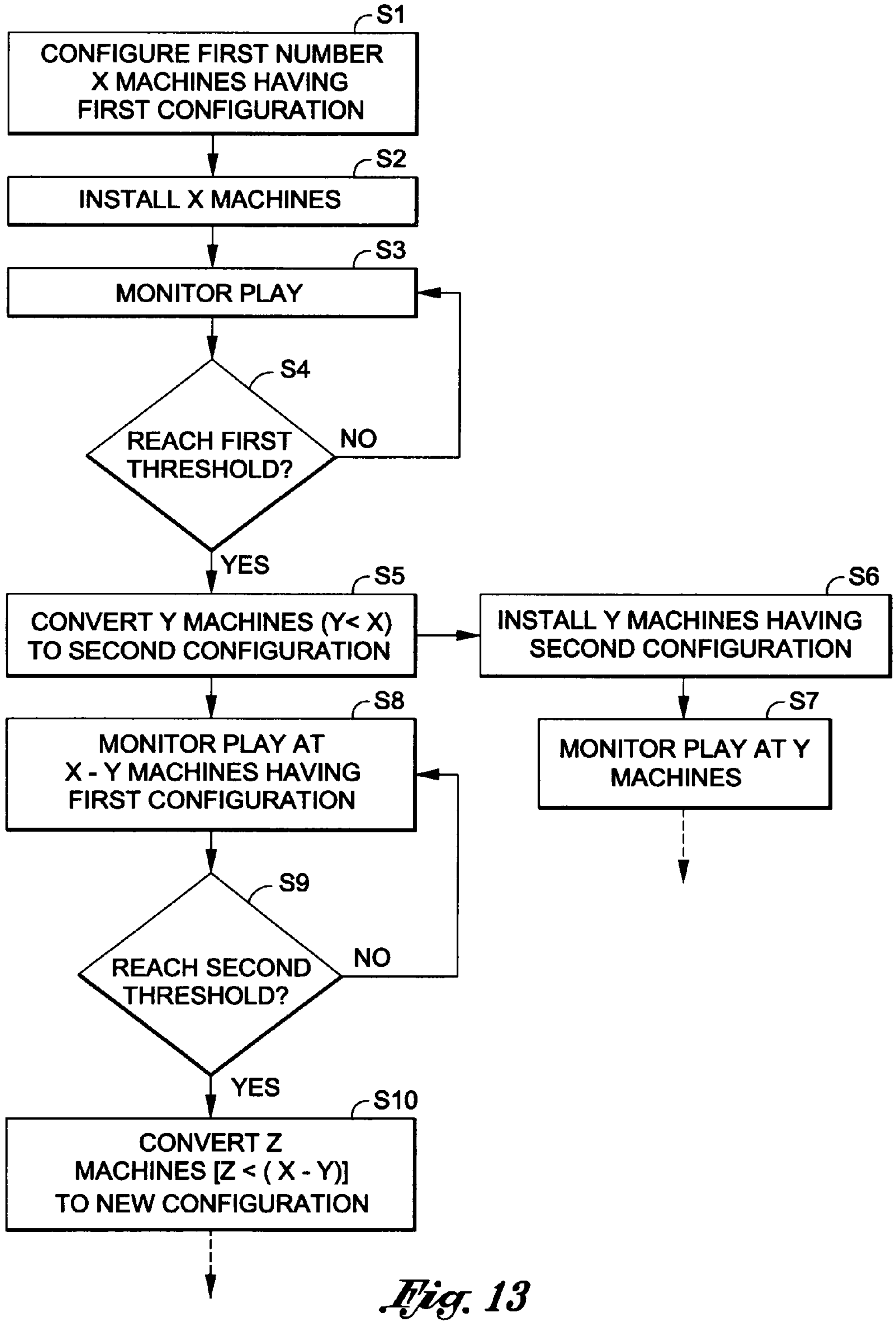
FIG. 13 is a flow diagram of a method of changing the configuration of gaming machines offering different games.

One aspect of the invention is a method and system for changing the appearance of gaming machines as part of optimizing the number of gaming machines which present particular games. One embodiment of a method will be described with reference to FIG. 13. As illustrated therein, in a first step S1 first number X of gaming machines are configured. In one embodiment, these gaming machines are configured to have a first appearance. The gaming machines may be configured to present a first game or games.

In a step S2, the first number X of gaming machines are installed and made operational. For example, the gaming machines may be installed on a casino floor of a casino.

In a step S3, game play at the first number X of gaming machines is monitored. The game play may be monitored manually or automatically/semi-automatically. One or more aspects of game play may be monitored, such as the volume of gross wagers during certain time periods, house hold on wagers during certain time periods or the like. In one embodiment, each gaming machine may be connected to a casino accounting system that permits gaming activity at each gaming machine to be tracked and monitored remotely. Various reports may be run which consolidate or provide information regarding game play activity at the one or more gaming machines.

In a step S4, it is determined if at least one game play threshold has been reached. The game play threshold may comprise one or more criteria. Such criteria might comprise a minimum level of wagering at one or more of the gaming machines over a time period (including a minimum average level of wagering across all of the X number of gaming machines). Preferably the threshold represents a level of game play which is less than an original level of play. Thus, the threshold may be set with reference to an initially monitored level of game play. For example, if the initial level of game play is $500.00 house hold per machine (average) per day, then the threshold level may be set to $250.00 house hold per machine (average) per day. However, the threshold might be a pre-set level of play, such as a level at which the machines are not sufficiently productive (even if that level is above a high percentage of the initial level of game play at the machines).

If the level of game play has not reached the threshold, then game play at the first number X of gaming machines continues to be monitored. If the level of game play has reached the threshold, then in a step S5 one or more of the X number of gaming machines are preferably taken out of service. The number of gaming machines taken out of service might comprise a certain percentage of the machines, including as dependent upon the level of play relative to the original level of play. For example, a number Y of the original X gaming machines may be taken out of service, thus leaving X-Y gaming machines still having the original configuration presenting the one or more first games. As one example, if the threshold level of play is 50% of the original level of play, then 50% of the gaming machines may be reconfigured.

In a preferred embodiment, when the Y number of gaming machines are taken out of service, they are reconfigured. In a preferred embodiment, their appearance is changed in accordance with the method and system described above. In particular, the appearance of the gaming machine may be changed by: (1) changing the location and/or appearance of the support panel or any dividers (by moving the panel/dividers up or down, the areas above and below the support panel change sizes); (2) changing the bezel and associated components, including the color or arrangement of components (such as to change the color of a bezel from chrome to a color, or to include one display, more than one display, a component area, such areas above or below the display(s), etc.); (3) changing the shape or appearance of the bumper; (4) changing the trim and/or frame covers for the door, including by changing their color, and/or changing other aesthetics of the door; (5) changing the one or more components located in the lower area (such as from a back-illuminated panel to a video display to a ticket printer, etc.), or (6) by changing other aspects of the appearance of the gaming machine, including as otherwise detailed herein (such changes might include a change to belly glass or other signage associated with the machine, for example, to bear the name of the new game that the gaming machine is configured to present).

In one embodiment, the Y number of gaming machines may be configured to have a second appearance and be configured to present one or more second games. The Y number of gaming machines may then be introduced (or supplemented with other machines), as in a step S6, and then be monitored as in a step S7. Of course, depending upon the level of play of such machines, one or more of those machines may be reconfigured to present other games in the same manner as just described above.

In a step S8, the remaining gaming machines (X-Y number of gaming machines) may be monitored. Once again, if one or more game play thresholds are met, as in a step S9, then in a step S10, one or more of the gaming machines may be taken out of service and be configured.

This method and system may be repeated until game play at the one or more gaming machines which present the one or more first games reaches a relatively steady state.

Additional aspects of the invention will be appreciated from an example of the invention.

Figure 14:
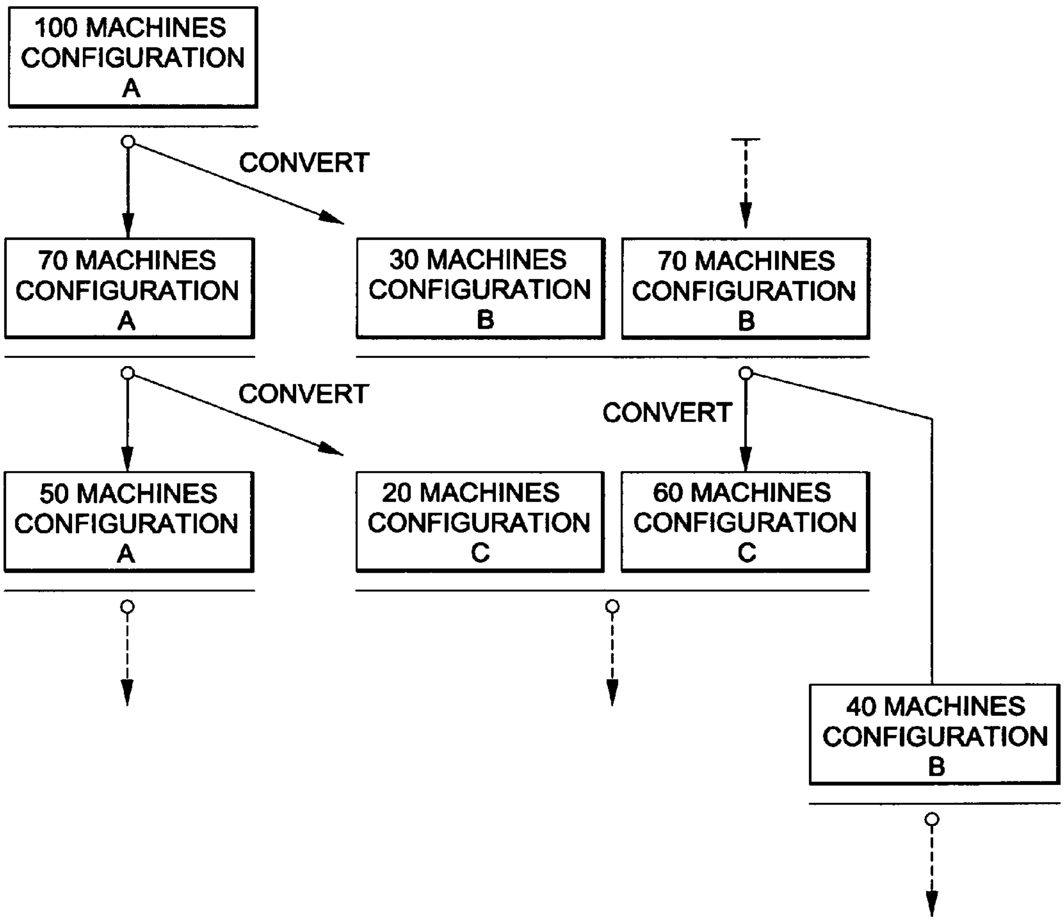
FIG. 14 illustrates an example of the re-configuration of gaming machines associated with a casino over time in accordance with the invention.

Referring to FIG. 14, 100 gaming machines may be configured with a first appearance A and to present the game “Wild West” video poker. The gaming machines might have an average house hold of 5% and, upon introduction, have an average level of play of $10,000.00 wagered per day and thus average house winnings of $500.00 per day.

After a period of time, the level of play at the “Wild West” gaming machines may drop off. As is common, upon introduction of a new gaming machine a large number of players may be enticed to play the gaming machine to see if they like the game. Some players will like the game and others may not. Thus, over time, the level of game play at the gaming machines may drop off.

After 60 days it may be determined that the level of game play has reached a threshold of house winnings of $400.00 per day. At this point, 30 of the “Wild West” gaming machines may be taken out of service. Those gaming machines may be configured as detailed herein so that they have a different appearance B. As one example, those machines may be configured to have a second appearance B and to present a “Cherries Deluxe” video slot game.

The remaining 70 “Wild West” gaming machines remain in service. Because there are fewer of those gaming machines relative to the level of game play, the level of game play at each gaming machine may increase, at least for a period of time. If the level of game play remains constant over time, all 70 “Wild West” gaming machines may remain in service.

However, assuming that the level of play continues to fall, such as to another threshold of house winnings of $300.00 per day, another 20 of the “Wild West” gaming machines may be taken out of service. Those gaming machines may be reconfigured to have a different appearance C. As one example, these machines may be configured to have a third appearance C and to present a “Super Bonus” electronic bingo game.

At that time, 50 “Wild West” gaming machines (having configuration “A”) remain in service. Preferably, the reduced number of gaming machines of that configuration causes the level of game play at those machines to remain relatively constant. In particular, at some point the level of game play may stabilize relative to play by players who play the gaming machines on a repeated basis and some volume of new players.

Relative to the 30 gaming machines that were converted to "Cherries Deluxe" gaming machines (having configuration "B"), an additional number of those gaming machines (such as 70) may be provided and that group of gaming machines (100 machines in total) may be introduced. As game play at those machines drops, one of more of those gaming machines may be taken out of service. For example, after some period of time, 60 of the "Cherries Deluxe" gaming machines (having configuration "B") may be taken out of service.

In one embodiment, those gaming machines may be reconfigured into "Super Bonus" bingo machines (machines having configuration "C"). Those 60 machines may be combined with the 20 machines converted from "Wild West" video poker machines so that 80 "Super Bonus" bingo machines (having configuration "C") may be introduced.

Most importantly, this aspect of the invention permits the number of gaming machines having a particular appearance and presenting one or more games to be optimized. A particular advantage of the invention is that because the appearance of a gaming machine may be changed, the gaming machine can be "reused". For example, in accordance with the prior art a gaming machine having a first configuration may cost $10,000.00 to manufacture into that particular configuration. When that gaming machine is taken out of service and a gaming machine having a second configuration and costing $10,000.00 to manufacture into that second configuration is put in its place, any value of the first gaming machine is lost. On the other hand, in accordance with the invention a gaming machine having a first configuration may cost $10,000.00. That gaming machine may be reconfigured to have a different appearance for $1000.00, thus saving $9000.00 relative to the cost of the purchase of a new second gaming machine.

Another important aspect of the invention is that the components used to define the appearance of the gaming machines may be moved and re-used. For example, gaming machines having a first configuration A may have chrome display bezel(s), chrome door trim and chrome upper and lower frame covers, as well as a particular bumper. When certain of those machines are reconfigured, the chrome components may be removed and replaced with those of a particular color, such as a red display bezel and matching red door trim and frame covers, and a different bumper, such as to configure the gaming machines into a configuration B having a different appearance. However, the chrome components may be re-used, such as on new machines or as part of creating gaming machines having a configuration C. Such "re-use" of components may extend to other components. For example, a gaming machine having configuration A may have a two main video displays in the door area along with a component panel with a small LCD display. The configuration of that gaming machine may be changed by removing the two main video displays and replacing them with a single larger display and by changing the component panel to one that only includes a bill validator and a ticket reader. However, the smaller displays and any associated dividers and the component panel with the small LCD display may be mounted to a door of another gaming machine. In this manner, various of the individual components which easily permit the configuration of a gaming machine to be reconfigured may be reused.

Because of this cost savings, casinos can change out gaming machines more often to fully optimize their gaming floor. In accordance with the prior art, the cost associated with having to purchase a second gaming machine is so high that a casino may find it cost prohibitive to take other gaming machines out of service even though they are yielding a low return. However, because the cost of reconfiguring a gaming machine in accordance with the present invention is so much lower, a casino can reconfigure gaming machines more often so maximize the return of each gaming machine.

Importantly, because the appearance of the gaming machines of the invention can be changed, gaming machines presenting particular games can have associated unique appearances that permit the players to identify the machines. This is important because the appearance of a gaming machine is important in allowing a player to identify a gaming machine. For example, relative to the last example, because of the different configurations (and thus appearances) A, B and C in FIG. 14, a player can easily distinguish between gaming machines that present "Wild West" video poker games and "Cherries Deluxe" video slot games because of the difference in the appearance of the gaming machines. This allows players to find the gaming machines they want to play faster and with less trouble.

Also, the ability to change the appearance of the gaming machines allows a casino to disassociate negative impressions from a gaming machine. A casino might introduce gaming machines having a particular appearance and presenting a particular game. That game may prove to be very unpopular. By changing the appearance of those gaming machines, the casino can "rebrand" the machines to present a different game and the stigma associated with the original appearance of the gaming machines can be avoided.

It will be appreciated that the configuration of various gaming machines may be changed back and forth or to entirely new configurations in accordance with the present invention. This permits a casino to constantly update the numbers of gaming machines that have certain configurations and present certain gaming machines based upon levels of customer demand. For example, a casino may have 100 machines of configuration A, 50 of configuration B and 50 of configuration C. By reconfiguring numbers of the gaming machines, the casino might change the gaming machines to 50 of configuration A and 75 each of configurations B and C.

As indicated herein, in a preferred embodiment when the configuration of a gaming machine is changed, the appearance is changed and the gaming machine is configured to present one or more different games. However, the appearance of a gaming machine could be modified without changing the one or more games which the gaming machine presents. Such might be done to create gaming machines with enhanced visual appeal (a casino might determine that players like a particular game but not the appearance of the associated machine and thus may change the appearance of one or more of those machines to enhance the appeal thereof).

As indicated herein, various means may be used to change the appearance of a gaming machine, such as changing exterior panels or facia, or changing the number or arrangement of various visible components (such as the number or arrangement of displays or the like). Preferably, the appearance of the gaming machine is changed without substantially changing the arrangement of the main cabinet of the gaming machine or the arrangement of the internal components. In this manner, the gaming machine is essentially reused.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of optimizing a number of gaming machines comprising the steps of:

providing a first number of gaming machines having a first configuration, said first number of gaming machines configured to present at least one first wagering game and said first configuration having a first appearance;

presenting said first number of gaming machines for play to one or more players;

monitoring game play at said first number of gaming machines;

if game play at said first number of gaming machines reaches a threshold level, changing a configuration of a second number of said first number of gaming machines to a second number of gaming machines having a second configuration, said second number of gaming machines configured to present at least one second wagering game and said second configuration having a second appearance which is different than said first appearance; and presenting said second number of gaming machines having said second configuration and said first number of gaming machines having said first configuration as reduced in number by said second number, for play to one or more players.

2. The method in accordance with claim 1 wherein said step of changing a configuration comprises changing at least an upper or lower frame cover of a door frame of a door of said gaming machines.

3. The method in accordance with claim 2 wherein said upper or lower frame covers have different finishes.

4. The method in accordance with claim 1 wherein said step of changing a configuration comprises changing a location or number of gaming machine components located in a display area of a door of said gaming machines.

5. The method in accordance with claim 4 wherein said gaming machine components are selected from a group consisting of: at least one electronic display, a speaker, a media reader and a keypad.

6. The method in accordance with claim 1 wherein said threshold level comprises a pre-set level of game play.

7. The method in accordance with claim 1 wherein said threshold level of game play comprises a reduced level of game play relative to an initial level of game play.

8. The method in accordance with claim 7 wherein said initial and threshold levels of game play are determined by the average amounts wagered per machine per day.

9. The method in accordance with claim 7 wherein said initial and threshold levels of game play are determined by an average house hold per machine per day.

10. The method in accordance with claim 1 wherein said second number of gaming machines comprises a number relative to said first number in the same proportional as a threshold level of game play to an initial level of game play.

11. The method in accordance with claim 1 further comprising the steps of monitoring the level of game play at said gaming machines having said first and second configurations and if said level of game play reaches another threshold level, reconfiguring one or of said machines into a third configuration.

12. The method in accordance with claim 1 wherein said threshold level comprises a reduced level of game play.

* * * * *